INVENTORS
CEDRIC H. BEEBE
ALLEN STRICKLER

United States Patent Office 3,649,505
Patented Mar. 14, 1972

3,649,505
AMMONIA SENSOR
Allen Strickler and Cedric H. Beebe, Fullerton, Calif.,
assignors to Beckman Instruments, Inc.
Filed Mar. 3, 1969, Ser. No. 803,781
Int. Cl. G01n 27/30
U.S. Cl. 204—195                    6 Claims

ABSTRACT OF THE DISCLOSURE

An electrochemical cell for measuring the ammonia content of a sample. The cell comprises a hydrogen ion sensitive electrode, such as a glass electrode, and a reference electrode joined by an ammonium ion containing electrolyte. The electrodes and electrolyte are separated from the sample medium being analyzed by means of a microporous hydrophobic membrane which is highly permeable to ammonia and substantially impermeable to liquid and ions. A preferred membrane of this character is a microporous polyvinylidene fluoride filter material.

BACKGROUND OF THE INVENTION

Field of the invention

This invention relates to an electrochemical cell and, in particular, to such a cell useful for measuring the ammonia content of either gaseous or liquid samples.

Description of the prior art

The measurement of ammonia is important in the analysis of water supplies, waste water, sewage and industrial plant effluents. The measurement of atmosphere ammonia is also of interest in refrigeration and ice-making plants, blueprint shops and chemical processing plants. At the present time, the analysis of ammonia in a liquid sample requires various sample treating steps, including distillation of the ammonia from the sample to separate it from interfering materials, followed by a colorimetric analysis which requires the addition of reagents to the distillate and comparison of the resulting color change with standard solutions. This process is time consuming and expensive.

It has been suggested previously that an electrode system analoguous to a well known electrochemical carbon dioxide sensor might be utilized for determining the ammonia content of samples. Such a carbon dioxide sensor uses a potentiometric glass electrode and a reference electrode which are joined by an electrolyte containing bicarbonate ion. The two electrodes and electrolyte are separated from the sample medium by means of a membrane which is permeable to carbon dioxide but relatively impermeable to liquid and ions. An example of such a membrane is polytetrafluoroethylene. In the use of such a sensor, carbon dioxide from the sample passes through the membrane into the electrolyte and equilibrates with the bicarbonate solution. The glass and rerference electrode system behind the membrane measures the hydrogen ion concentration of the electrolyte which is essentially proportional to the logarithm of the partial pressure of carbon dioxide in the sample. Such a sensor is described in greater detail in "A Potentiometric Glass Electrode Carbon Dioxide Sensor for Use in Aero-Space Applications," Instrument Society of American Conference Preprint No. 76–LA–61.

If, as it has been previously suggested, an electrode system as described above is utilized for determining the ammonia content of a sample and the electrolyte is distilled water or a solution of a neutral salt, the ammonia gas in the sample will permeate through the membrane into the electrolyte and will establish an equilibrium ammonia concentration with the sample. As in the carbon dioxide sensor, this results in a change in hydrogen ion activity of the electrolyte which is sensed by the glass electrode. Thus, the output of the glass electrode is related to the logarithm of the ammonia concentration of the electrolyte which in turn is a measure of the partial pressure of ammonia in the sample. However, we have found that when utilizing distilled water or a neutral salt solution as the electrolyte in the above described electrode system, the system is unstable due to variable traces of pH-affecting species in the electrolyte, for example carbon dioxide derived from the sample, alkalis leached from the glass membrane of the glass electrode, or impurities in the gas-permeable membrane. In addition, for the reasons which will appear later, the system produces a non-linear output. Moreover, we have found that in the use of the electrode system discussed above employing conventional membranes, such as polyethylene, Teflon TFE [polytetrafluoroethylene], or Teflon FEP [a fluorinated ethylene-propylene copolymer], the response of the sensor to changing ammonia concentrations of the sample is extremely slow due to the very low permeability of these membrane materials to ammonia. Silicone rubber membranes also are not pratical since ammonia shows a high degree of solubility in this material. Thus, they can absorb large amounts of ammonia from the sample. We further found that by stretching Teflon TFE over the glass electrode tip so as to produce a cloudy appearance in the membrane material, which appears to be a result of crystallization and reordering of the membrane structure, the sensor will have a relatively faster response to changes in ammonia concentration than the other membranes discussed above. Unfortunately, however, when the Teflon TFE is stretched sufficiently to produce acceptable response times, water and ions will slowly pass therethrough resulting in long term drifts in the electrolyte pH thereby causing errors in the output signal of the electrode system. Thus, none of the above mentioned membrane materials are considered practical for use with the electrochemical sensor described above for measuring the ammonia content of samples.

SUMMARY OF THE INVENTION

The principal object of the present invention is to provide an improved electrochemical cell for measuring the ammonia content of samples.

Another object of the invention is to provide an ammonia sensor which has relatively fast and high response to changing ammonia concentrations of samples.

According to the one aspect of the present invention, we have discovered that an electrochemical cell of the general type described above will have a stable and linear output by incorporating an ammonium salt in the electrolyte. In addition, we have found that the cell will have essentially theoretical response to ammonia and relatively fast response to changing ammonia concentrations of samples by utilizing therein a microporous hydrophobic membrane material which is substantially nonabsorbant to ammonia. Unlike the plastic materials described above which are sintered or cast polymers and thus not microporous, the membrane utilized in the present invention has a sufficiently great porosity so as ot permit relatively free passage of ammonia gas but not so great as to permit significant passage of ions or liquid.

DESCRIPTION OF THE PREFERRED EMBODIMENT

Figure 1:
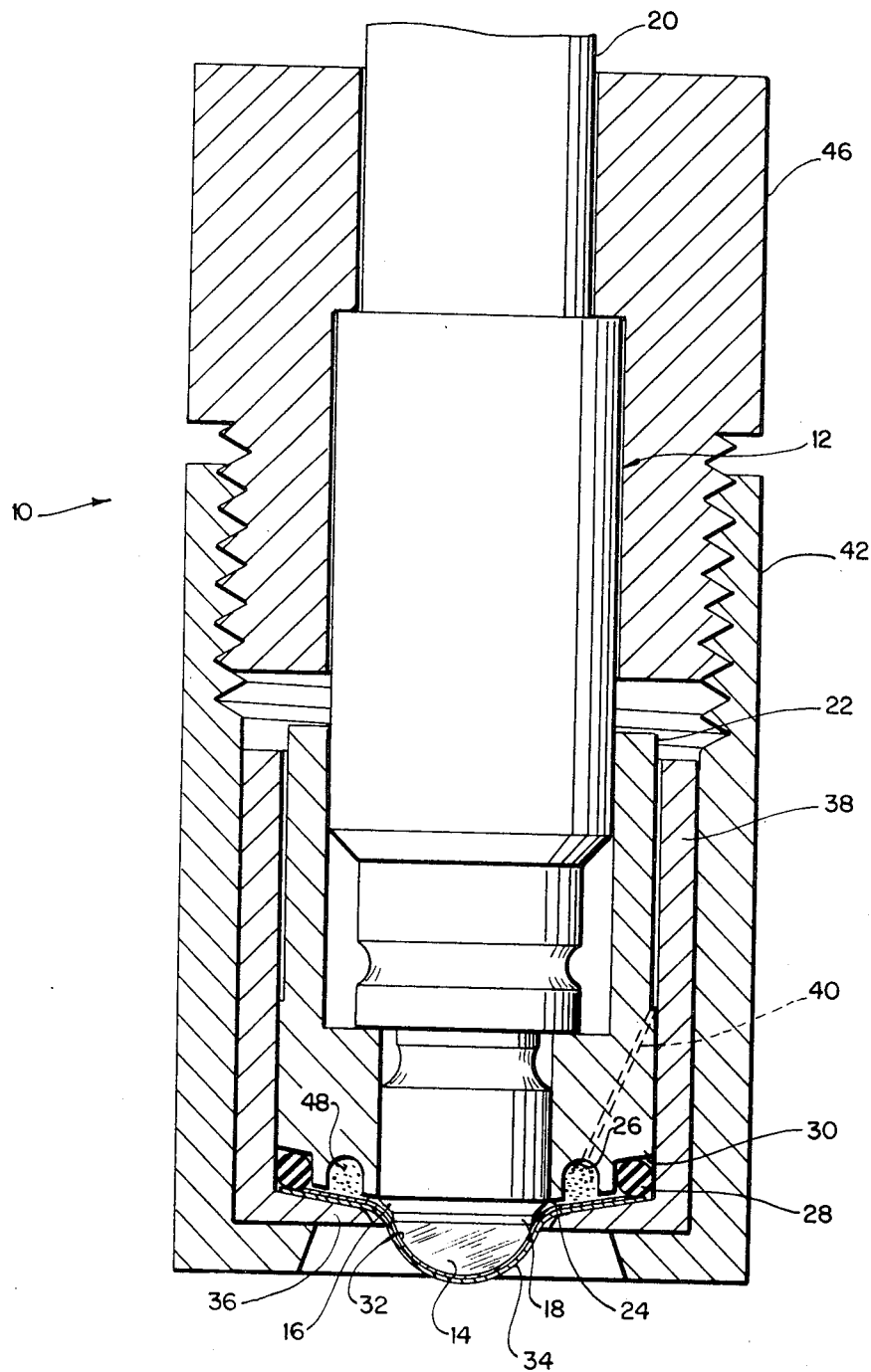
FIG. 1 is a partial longitudinal sectional view of an ammonia sensor constructed in accordance with the present invention.

The electrochemical cell of the present invention is illustrated in FIG. 1 and is generally designated 10. The cell includes an electrode assembly 12 which comprises a hydrogen ion measuring glass electrode and a reference electrode. As well known in the art, a glass electrode comprises a tube of nonconductive material closed at one end by a bulb of hydrogen ion sensitive glass. An internal half cell, such as a silver-silver chloride electrode, is immersed in a suitable electrolyte solution filling the tube. In FIG. 1, the ion sensitive glass bulb of the glass electrode is indicated at 14 while the remainder of the electrode is mounted within the assembly 12 and is not shown. The reference electrode of the assembly 12 is indicated at 16 and comprises a silver ring coated with silver chloride. The ring 16 is separated from the glass bulb 14 and the remainder of the glass electrode by means of a nonconductive sleeve 18 and suitable insulating material within the assembly 12. The internal half cell (not shown) of the glass electrode and the reference electrode 16 are adapted for connection to a suitable pH meter via conductors (not shown) passing through a cable 20. Thus, the electrode assembly 12 constitutes a combination glass-reference electrode of the general type often utilized in the art for measuring the hydrogen ion concentration of solutions.

The forward end of the assembly 12 is mounted within a cylindrical body 22 formed of nonconductive material. The reference electrode 16 and glass electrode bulb 14 extend beyond the forward face 24 of the body 22. An annular groove 26 is formed in the forward end of the body 22 and opens at the forward face 24 thereof to provide an electrolyte reservoir. An elastomeric O-ring 28 is positioned in an annular recess 30 located at the forward outer edge of the body 22. A hydrophilic membrane 32, such as very thin cellophane or filter paper, and an outer ammonia permeable membrane 34 cover the ion sensitive bulb 14. The inner membrane 32 ensures that an electrolyte film is provided between the outer membrane 34 and the bulb 14. The outer edge of the membrane 34 is cemented to an inwardly extending flange 36 on a cylindrical membrane support 38 which surrounds the body 22. As can be appreciated, the O-ring 28 serves to provide a seal between outer edge of the body 22 and the inner surface of the sleeve 38. Preferably a vent passage 40 is formed in the body 22 to provide pressure compensation for the membrane 34.

The sleeve 38 is mounted within an outer cylindrical body 42 which is internally threaded at its upper end 44 for engagement with a clamping nut 46.

The reservoir 26 and the space between the bulb 14 and membranes 32 and 34 contains an electrolyte 48 which joins the glass and reference electrodes. An important factor which apparently has not been considered previously concerning the electrolyte is that a portion of the ammonia which diffuses through the membrane into the electrolyte may be tied up as ammonium ion, in which form it is undetected by the glass electrode. This can be understood by the following equation which represents the reaction of ammonia gas with water:

(1) 

The ratio of ammonia concentration (as ammonium hydroxide) to ammonium ion concentration, and their relation to the pH at equilibrium, is given by the following equation:

(2)
$$\log_{10} \frac{(NH_4OH)}{(NH_4^+)} = \mathrm{pH} - pK_{H_2O} + pK_{NH_4OH}$$

where the K values are dissociation constants, $p$ stands for $(-\log_{10})$, and the brackets denote molar concentration (or more strictly, the activity). Taking $K_{H_2O}$ and $K_{NH_4OH}$, respectively, as $1 \times 10^{-14}$ and $1.8 \times 10^{-5}$ (at 25° C., Equation 2 may be rewritten as follows:

(3)
$$\log_{10} \frac{(NH_4OH)}{(NH_4^+)} = \mathrm{pH} - 9.256$$

This indicates that when the electrolyte attains a pH of 7.256 on equilibration with the sample, only 1 percent of the ammonia content is present as ammonium hydroxide or "free" ammonia, the rest being in the form of ammonium ion. At pH 8.256 the ratio of "free" to fixed ammonia ($NH_4^+$) is 0.1 to 1.0. At pH 9.256 the ratio is unity, while at pH values of 10.256 and 11.256 ammonia is respectively 91 perecnt and 99.1 percent free. Thus, in the measurement of ammonia in very small concentrations, it can be appreciated that, first, only a very small amount of $NH_4^+$ (by conversion of ammonia from the sample), will ever be present in the electrolyte. This ammonium ion concentration will vary with the varying concentration of ammonium hydroxide at equilibrium, as samples of different ammonia content are measured. As a result, the equilibrium pH will not vary linearly with the log $_{10}$ of the sample ammonia. Secondly, if traces of substances such as $CO_2$ or alkali from the glass are present, these will be competitive, in 1 to 1 ratio, with the ammonium hydroxide in establishing the final pH of the electrolyte.

We have found that the measurement of ammonia with the above described electrode system may be made essentially linear and independent of traces of pH-affecting impurities by adding a sufficient amount of ammonium salt to the electrolyte so that the molarity of ammonium ions in the electrolyte resulting from the salt is greater than the maximum molarity of ammonia which will dissolve in the electrolyte as a result of equilibration with the sample. The ammonium ion concentrated is then nearly constant despite variations in the equilibrium ammonia concentration, and indifferent to pH-affecting impurities entering the electrolyte. Accordingly, as shown by Equation 3 above, one will obtain more nearly linear response of the electrode system with respect to the logarithm of the sample ammonia concentration. For a fully linear response in a practical sense it is best to have the ammonium ion molarity of the electrolyte on the order of at least ten fold greater than the maximum molarity of ammonia which will dissolve in the electrolyte from the sample. A suitable ammonium salt which may be dissolved in the electrolyte is ammonium chloride, although other ammonium salts obviously could be used. If the anion of the salt is other than chloride, a neutral chloride such as potassium chloride in known concentration should supplement the ammonium salt to establish a fixed reference potential for the silver-silver chloride reference electrode. By way of example, we have successfully utilized electrolytes in the sensor of the present invention having an ammonium chloride concentration between 0.01 M and 3 M. The preferable electrolyte is a 0.1 M ammonium chloride solution containing about 3% CMC, which is a commercially available gelling agent sold by Hercules Powder Co.

In accordance with another feature of the present invention, we have discovered that an electrochemical sensor of the type described above will have essentially theoretical response to ammonia and rapid response to changes in the ammonia content of a sample if the membrane 34 is formed of a microporous hydrophobic material having a porosity sufficiently great so as to readily pass ammonia gas but not so great as to permit any appreciable passage of ions or liquid. By the term "microporous material," reference is made to that class of membrane materials characterized by having a very open highly porous structure with a porosity (i.e., percent of void space) ranging from about 60–85%, low specific gravity or density and which present a very low pressure drop to the passage of gases. A suitable membrane having the above characteristics is a microporous polyvinylidene fluoride filter material sold under the tradename Metricel VF–6 by Gelman Instrument Company. This material has an average pore size of 0.45 micron and a maximum pore size of 1.5 microns. The material has a density of about 0.33 g./cm.$^3$ and a porosity of about 81%. In view of the porosity of the membrane and its hydrophobic character, it does not permit passage of ions or liquid at atmospheric pressure. However, under 30 p.s.i. pressure, water is capable of passing through this material. Such pressures, however, are not normally encountered when utilizing the cell of the present invention. In addition, polyvinylidene fluoride has the advantage that it is substantially nonobsorbant to ammonia.

It is of course understood that the present invention is not limited to the use of the polyvinylidene fluoride membrane material described above, since other microporous membrane materials may be utilized if they have the characteristics of being hydrophobic, substantially nonabsorbant to ammonia, relatively impermeable to liquid and ions, and will pass ammonia freely therethrough. For example, there are presently available microporous polyvinyl chloride filters which could be used. In addition, plastics such as polyethylene, Teflon or FEP, could be utilized if properly treated, such as by electron bombardment techniques, to render them microporous. Moreover, hydrophilic microporous membrane materials may be utilized if treated so as to become hydrophobic. For example, microporous cellulose acetate filters sold by Millipore Inc., and other similar hydrophilic microporous materials may be utilized by exposing them to a water repellant in vapor or liquid form to coat the pore surfaces therein. For example, a solution of a halogenated silane, such as dimethyl dichloro silane in a volatile solvent, may be applied to the microporous hydrophilic material, allowed to evaporate and then hydrolized by exposure to atmospheric moisture. Other forms of liquid repellant solutions which could be utilized are perfluorinated cationic surfactants, such as Zepel sold by Du Pont or FC805 sold by Minnesota Mining and Manufacturing Company, the latter being the active substance of Scotchgard, a well known liquid repellant commonly utilized on fabrics.

An electrochemical cell as illustrated in FIG. 1 employing a 0.006 inch thick Metricel VF–6 membrane and a 0.1 normal ammonia chloride electrolyte has been tested in six separate test solutions having free ammonium hydroxide concentrations of 100 p.p.m., 10 p.p.m., 3.1 p.p.m., 1.0 p.p.m., 0.32 p.p.m., and 0.1 p.p.m. The pH of these solutions was 8.30. Each ammonium hydroxide test solution had a known equilibrium partial pressure of ammonia, which was sensed indirectly by the cell of the invention by diffusion of the ammonia through the membrane and detection of the corresponding change in the pH of the cell electrolyte.

Figure 2:
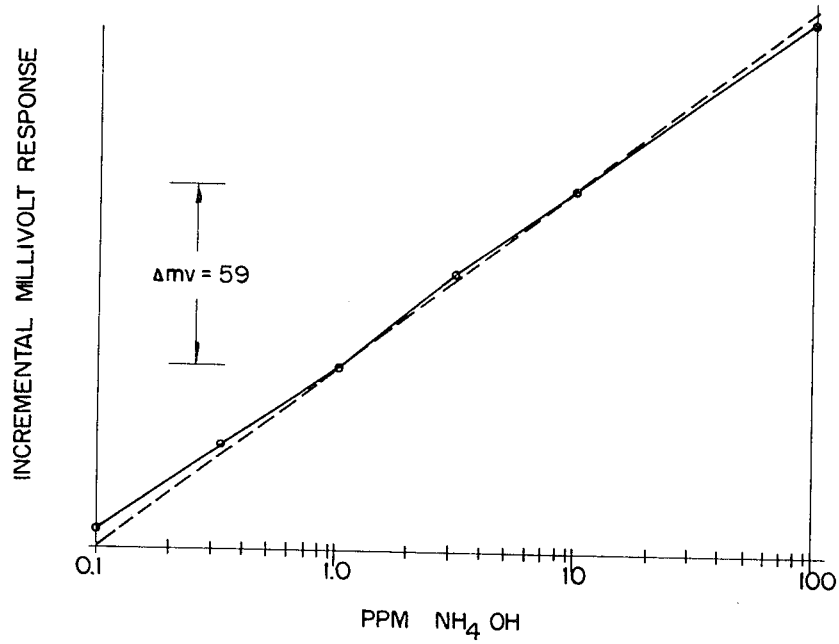
FIG. 2 is a graph showing data for actual millivolt incremental response of the electrochemical sensor of the present invention in the presence of six different aqueous test solutions having ammonium hydroxide concentrations over the range of 0.1 to 100 p.p.m.

The millivolt response of the electrochemical cell tested in these solutions is plotted on the graph shown in FIG. 2 and is represented by the continuous line. Absolute millivolt indications are omitted from the chart since these have no significance, there being a variable "bias" on the voltage output of the electrode which depends on the type of half-cell used for the reference electrode, chloride ion concentration, the asymmetry potential in the glass electrode, etc. As a consequence, only the differential millivolt value has been indicated on the chart. In an ideal situation, the cell would yield the theoretical voltage increment or "Nernstian response" of approximately 59 millivolts change for each decade of concentration change; such response is represented by the dotted line in FIG. 2. In practice, the electrode would be calibrated against at least one ammonium hydroxide standard solution, and the known Nernstian slope would set the "span" of the calibration.

As can be seen by comparing the continuous line against the theoretical response curve in FIG. 2, the output of the cell in respect to linearity and slope corresponded almost identically to theoretical output over a 100 fold change in the ammonium hydroxide concentration of the test solutions, while the response of the cell deviated from Nernstian response only slightly in the very low concentrations of ammonium hydroxide.

Figure 3:
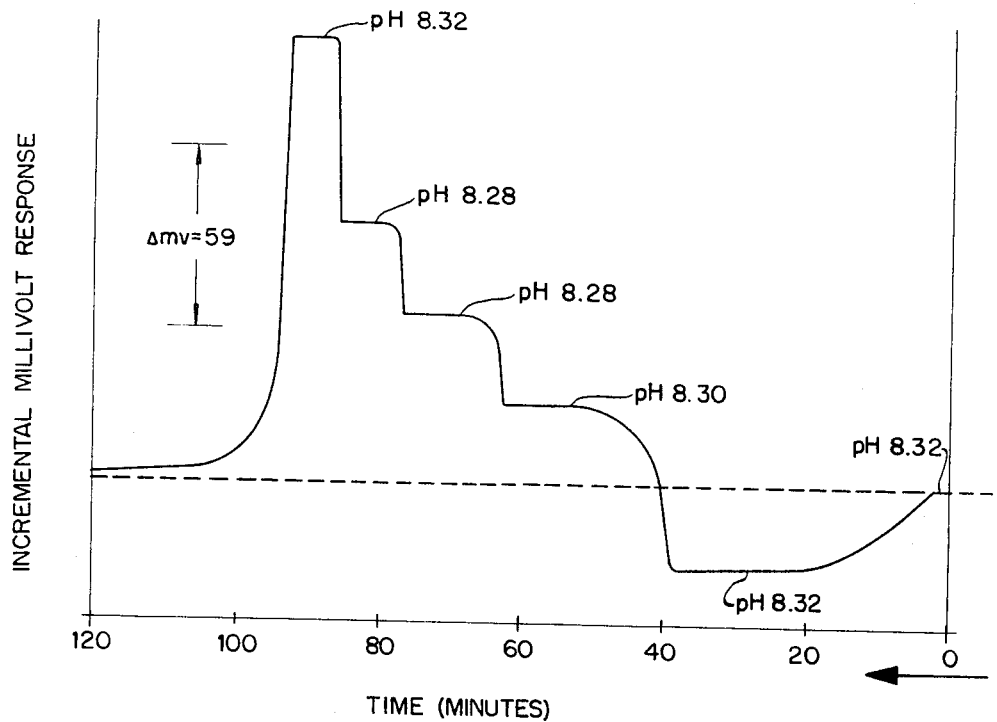
FIG. 3 is a representation of an actual trace on a recording strip chart showing the response of the ammonia sensor to various concentrations of ammonium hydroxide.

The fast response characteristics of the cell of the present invention can best be appreciated by making reference to FIG. 3 which shows a recorder trace of the electrical output of the above described sensor when subjected to a variety of samples having different ammonium hydroxide concentrations. Commencing from the right side of the chart illustrated in FIG. 3, the trace between 1 and 2 minutes indicates the response of the cell to a sample solution containing 0.3 p.p.m. ammonium hydroxide. After two minutes, the sensor was immersed in a test solution containing 0.1 p.p.m. ammonium hydroxide. After thirty-eight minutes, the cell was immersed in a test solution containing 1.0 p.p.m. ammonium hydroxide. After sixty-three minutes, the cell was immersed in a test solution containing 3.1 p.p.m. ammonium hydroxide. After seventy-four minutes the cell was immersed in a test solution containing 9.7 p.p.m. ammonium hydroxide. After eighty-six minutes the cell was then immersed in a test solution containing 103 p.p.m. ammonium hydroxide. Finally, after ninety-four minutes the cell was immersed in a test solution containing 0.32 p.p.m. ammonium hydroxide. It was possible to prepare these test solutions in stable and accurately known form at low ammonium hydroxide concentrations by dissolving known quantities of ammonium salt in an alkaline pH buffer. With the pH fixed, then according to Equation 3 above a constant proportion of the ammonium ion is converted to ammonium hydroxide. The chart indicates the actual sample pH at each measurement. As can be seen, the response of the cell is most rapid for changes in ammonium hydroxide concentration at high concentration levels, averaging about one minute for a step change from 3 to 103 p.p.m. ammonium hydroxide. As seen in the right-hand side of the chart, and as would be expected, the response time of the cell was lower with lower concentrations of ammonium hydroxide. As in FIG. 2, it is not the absolute millivolt values which are significant, but rather the incremental or decremental millivolt change for a given ratio of change in the ammonium hydroxide.

As will be seen below, the response time of our cell is significantly faster than that of cells employing conventional nonporous plastic membrane materials. For example, a cell employing a one-quarter mil thick unstretched Teflon TFE membrane exhibited only a 2-millivolt change in response in about 20 minutes when shifted from $10^{-3}$ N to $10^{-4}$ N ammonium hydroxide test solutions. Such solutions are equivalent to test solutions containing about 37 p.p.m. and 3.7 p.p.m., respectively of ammonium hydroxide. When utilizing a slightly stretched one-half mil Teflon TFE membrane, the cell produced a 15 millivolt response change over twenty minutes when shifting from $10^{-3}$ N to $10^{-4}$ N ammonium hydroxide solutions. When a .0005 inch Teflon TFE film stretched until it had a cloudy or whitish color was used in a cell, the cell produced a 48.5 millivolt response, which approaches theoretical response, when subjected to the above described test solutions. However, it required thirty minutes before the cell reached equilibrium. A one-quarter mil thick Mylar film, 0.4 mil polystyrene film and an elastic rubber membrane have been utilized in the cell but the response of the cell was also considerably slower than that when the microporous membrane of the invention was used. Thus, in the comparable concentrations of test solutions, the cell of the present invention reaches full response in only about two minutes while cells employing nonporous membranes as described above reached their full response in no less than about fifteen minutes.

The relationships expressed in Equations 1, 2 and 3 above are also applicable to the ammonia equilibrium relationships in an aqueous sample. Thus, the detectable level of total ammonia in an aqueous sample (the combined ammonium salt, ammonium hydroxide and molecular ammonia) is dependent upon the hydrogen ion concentration of the sample. In increasingly acid solutions an increasing portion of the ammonium hydroxide in the sample will be tied up as ammonium ion and not be detectable by the cell. As a consequence, in order to measure ammonia content of samples of a low ammonia concentration, the sample should be alkalyzed, preferably to a pH of about 11.5 or higher. Samples of high ammonia content can be measured at pH 8.3 or less if a correction factor is applied which can be determined by an accurate measurement of the pH of the sample solution and use of the relationship given by Equation 3.

In view of the foregoing, it is evident that by the present invention there is provided an instrument for determining the ammonia content of a sample which is inexpensive, highly sensitive to ammonia, and has a sufficiently fast response to changes in ammonia concentration so as to be quite practical for most applications.

Although several embodiments of the invention have been disclosed herein for purposes of illustration, it will be understood that further variations and modifications of the structures, materials and uses disclosed and discussed herein may be made without departing from the spirit of the invention, the scope of which is defined by the following claims.

What is claimed is:
1. In an electrochemical cell for measuring the ammonia content of a sample, the cell having a potentiometric hydrogen ion sensitive electrode and a reference electrode joined by an electrolyte and having a membrane arranged so as to separate the electrodes and electrolyte from the sample being analyzed, the improvement which comprises:
said membrane being a microporous polyvinylidene fluoride filter material.
2. An electrochemical cell as set forth in claim 1 wherein said membrane has an average pore size of about 0.45 micron.
3. An electrochemical cell as set forth in claim 2 wherein said membrane has a maximum pore size no greater than about 1.5 microns.
4. An electrochemical cell as set forth in claim 1 wherein said membrane has a thickness of about .006 inch and an average pore size of about 0.45 micron.
5. An electrochemical cell as set forth in claim 1 wherein said membrane has a density of about 0.33 g./cm.$^3$.
6. An electrochemical cell as set forth in claim 1 wherein said membrane has a porosity in the range of about 60–85%.

References Cited
UNITED STATES PATENTS

| | | | |
|---|---|---|---|
| 3,098,813 | 7/1963 | Beebe et al. | 204—1 X |
| 3,413,209 | 11/1968 | Hersch | 204—1 X |

OTHER REFERENCES

| | | | |
|---|---|---|---|
| 1,040,823 | 9/1966 | Great Britain | 204—195 |

GERALD L. KAPLAN, Primary Examiner

U.S. Cl. X.R.

204—1 T